United States Patent [19]

Dahringer et al.

[11] Patent Number: 5,793,916
[45] Date of Patent: Aug. 11, 1998

[54] HERMETICALLY SEALED CONNECTION ASSEMBLY FOR TWO OR MORE OPTICAL FIBERS

[75] Inventors: Donald W. Dahringer, Glen Ridge, N.J.; Gary S. Duck, Nepean, Canada

[73] Assignee: JDS Fitel Inc., Nepean, Canada

[21] Appl. No.: 754,034

[22] Filed: Dec. 3, 1996

[51] Int. Cl.[6] ............................................. G02B 6/255
[52] U.S. Cl. ........................... 385/95; 385/33; 385/73; 385/74; 385/94
[58] Field of Search .............................. 385/95, 33, 35, 385/73, 74, 75, 93, 94, 138, 139

[56] References Cited

U.S. PATENT DOCUMENTS

| | | | |
|---|---|---|---|
| 4,033,668 | 7/1977 | Presby | 350/96 C |
| 5,143,531 | 9/1992 | Kramer | 65/3.11 |
| 5,155,795 | 10/1992 | Wasserman et al. | 385/138 |
| 5,210,815 | 5/1993 | Alexander et al. | 385/138 |
| 5,337,387 | 8/1994 | Kramer | 385/76 |

*Primary Examiner*—Phan T. H. Palmer

[57] ABSTRACT

A connection assembly for two or more optical fibers, which is hermetically sealed by means of a thin-walled flexible metallic sleeve. The assembly comprises two fiber ends, each terminating in an optical component such as a lens, the lenses having distal end faces held together so that light can pass from one fiber to the other through the lenses, and a fiber tube is mounted on each fiber adjacent the proximal ends of the respective lens and is hermetically sealed to the fiber. Each fiber tube has a metallic coating, and the thin-walled metallic sleeve is connected by solder to the metallic coatings on the fiber tubes. Preferably, the metallic sleeve has a central portion with bellows-like convolutions.

8 Claims, 2 Drawing Sheets

HERMETICALLY SEALED CONNECTION ASSEMBLY FOR TWO OR MORE OPTICAL FIBERS

BACKGROUND OF THE INVENTION

1. Field of the Invention

The present invention relates to a connection assembly for joining together two or more optical fibers, and which provides a hermetic seal around the fiber ends, so that the assembly resists the effects of humidity or of gases on components of the connection, including adhesives used in such connections.

2. Prior Art

Many optical fiber connection assemblies incorporate lenses or other components, such as filters, which may become contaminated when subjected to gases or high humidity, especially at high temperatures. Sometimes, lenses between which light is transmitted are sealed together by index matched adhesives, but these can also be affected by gases and humidity. Attempts have been made to avoid these problems by providing a hermetically sealed enclosure for the connection assembly.

In U.S. Pats. Nos. 5,143,531 and 5,337,387, both to Kramer, and which issued Sep. 1, 1992, and Aug. 9, 1994, respectively, optical fibers are sealed to components by means of glass which is melted into place. However, this method is used for connecting fibers to a metallic component, and is not relevant to connecting fibers end to end.

U.S. Pat. No. 4,033,668, issued Jul. 5, 1977 to Presby, does show a connection assembly for connecting fibers end to end. Specifically, a splice arrangement is shown in which the cylindrical end portions of two abutted fibers are each provided with a layer of metal, and the joint between the end faces is protected with a bead of solder adhered to these metal layers. This and other similar methods which involve stripping the fibers of their protective coating and metallizing the fibers are liable to cause fiber damage because they subject the fiber to high stress.

The connection shown in the Presby patent relies on light transmission between ends of fibers. It is often preferable for the fiber ends to be provided with optical components, for example cylindrical lenses of the GRIN (graded index) type, to achieve good transmission between the fibers. The only prior art arrangements known to the Applicants which allow such connection assemblies to be hermetically sealed are those in which the lenses and associated parts are enclosed within a metal sleeve which is somewhat rigid, at least in resisting expansions and compressions, and in which temperature cycling causes stresses and eventual fatigue fractures in the sleeve or adjacent parts. The known construction is also somewhat complex in using an inner metallic tube between a fiber tube and the metal sleeve, and the metallic tube has potential leak paths on both its inside and outside surfaces.

There is a need for a hermetically sealed optical fiber assembly, incorporating lenses or other components, which is relatively simple, and maintains a good seal in spite of continued exposure to temperature changes.

SUMMARY OF THE INVENTION

In accordance with the present invention, a hermetically sealed connection assembly for two or more optical fibers comprises:

two fiber ends, each terminating in a lens or other optical component, and arranged so that light signals can pass from one fiber to the other;

a fiber tube mounted on each fiber, means hermetically sealing the fiber tubes to the fibers;

a metallic coating on outer surfaces of each of the fiber tubes; and a thin-walled, flexible metallic sleeve connected by solder or like fusible metal directly to the metallic coatings on the fiber tubes to form a hermetic seal surrounding the lenses or other components.

The metallic sleeve may have a bellows type convoluted configuration to allow expansion and contraction with little stress. Alternatively, it may be made of foil, preferably with some convolutions, pleats, crinkles or the like to allow it to be expanded or contracted with little stress.

BRIEF DESCRIPTION OF THE DRAWINGS

Preferred embodiments of the invention will now be described by way of example with reference to the accompanying drawings, in which.

DETAILED DESCRIPTION

Figure 1:
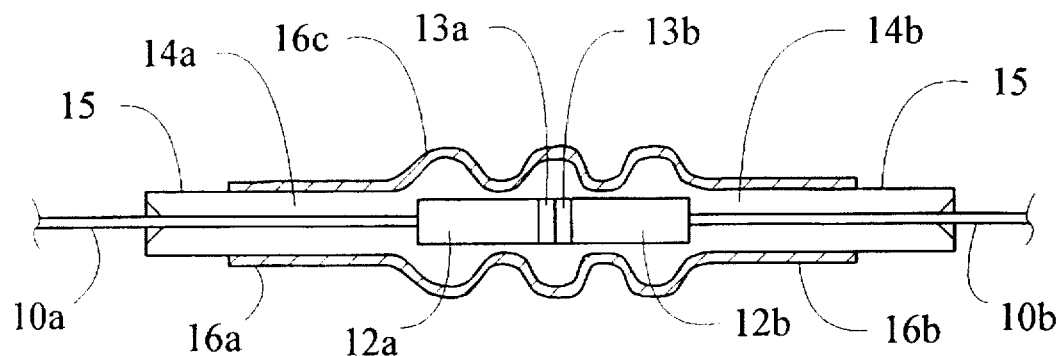
FIG. 1 shows a longitudinal section through a first embodiment of a connection assembly.

Referring to FIG. 1, the connection assembly connects a first optical fiber 10a to a second optical fiber 10b. In order to provide good light transmission between the fibers, the end of each fiber is provided with a cylindrical graded index (GRIN) lens 12a, 12b, these lenses being well-known for use with optical fibers. The distal end faces of the two lenses are separated by filters 13a and 13b which are in close contact, and may be connected by a layer of adhesive which may be index matching. While such adhesive has good light transmitting properties, in prior art devices in which this adhesive is unprotected it has been found to be affected by high humidity and/or by gases or liquids.

Each fiber carries, adjacent the proximal end of each lens 12a, 12b, a "fiber tube" 14a, 14b, which is a well-known component of fiber optic devices and which may be made of glass or ceramic. This has a central bore having a flared inlet end which receives the fiber as a close fit. Optical fibers normally have a coating of protective material, usually a plastic, which coating is removed from the end portions of the fibers before these end portions are secured within these fiber tubes by means of adhesive such as an epoxy. Since the gaps between the fibers and tubes are very small, this adhesive is not much affected by gases or moisture.

The outer surface of each fiber tube 14a, 14b, has a metallic coating 15 applied to the tube before it is assembled to the fiber. Preferably, the coating 15 includes a thin layer of indium tin oxide (ITO), applied by vacuum deposition, and on which copper or other solderable metal is then electroplated in a plating bath. After assembly of the tubes and lenses onto the fibers, and joining of the lenses via the filters, a metal sleeve 16 has its two cylindrical end portions 16a and 16b fitted over the cylindrical surfaces of the fiber tubes and directly soldered to the coatings. The two end portions of the sleeve are joined by a central bellows portion 16c.

The solder or like metal used to connect the sleeve to the tubes can be provided in the form of a solid wire, a flux containing wire, a preform, a paste, or a heavy plating or coating on either the fiber tube or on the inside of the sleeve, or a combination of these. The soldering process can be achieved by direct heating of the joint using contoured soldering irons, focussed infra-red radiation, laser heating, resistance heating, condensation, or other forms of energy transfer such as hot gases, ovens, or fluid immersion. The joints may be soldered simultaneously or sequentially.

The preferred method of heating for the soldering step is to put the sleeve in a heating block at close to the soldering temperature, which has the effect of expelling air as well as melting the solder. The soldering requires a temperature of over 100° C., while it is preferred to keep the lenses and associated components at a lower temperature. Preferably, the heating block has two heating elements, one for each end of the sleeve, and opens up to provide a recess to accommodate the bellows. The end portions of the heater block may act as heat sinks to limit the temperature of the assembly. In practice small compressive forces may be applied to the sleeve while soldering to ensure the absence of metal tension on cooling of the assembly. Without such compression, tension may arise in the sleeve due to the greater expansion coefficient of the metal of the sleeve as compared to that of the glass or ceramic components.

Typical solders which can be used to connect the sleeve to the tube are:

| Alloy | M.P. (Degree C) |
| --- | --- |
| Sn 63%; Pb 37% | 183° |
| Bi 58%; Sn 42% | 140° |
| Bi 55.5%; Pb 44.5%; | 124° |
| In 52%; Sn 48% | 117° |
| Bi 50%; Sn 20%; Pb 30% | 100° |

The sleeve 16 may be a thin walled component produced by electro-depositing spring quality metal onto a mandrel having the shape of the inside of the bellows, and then dissolving out the mandrel. Small flexible bellows can be produced in this way, which are seamless and non-porous, and having typically thickness of less than 0.002 inches. Such a sleeve is capable of expanding or contracting with the optical components of the assembly while subjecting these components to very little stress. Suitable metals for the sleeve are copper, nickel, and brass. Bellows can also be made by welding, or by hydrostatic forming.

The hermetic seal provided as described is effective to protect the lenses and filters, and adhesives used between these, from the effects of humidity and gases. The end surface of the adhesive joining the fibers to the tubes 14a and 14b is too small for gases to have much effect at this point.

Figure 2:
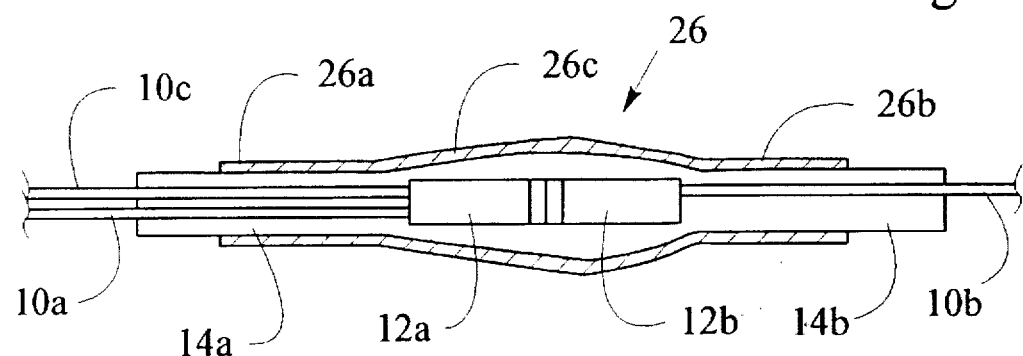
FIG. 2 shows a longitudinal section through a second embodiment of the invention.

FIG. 2 shows an assembly which is similar to that of FIG. 1, except for number of optical fibers 10a, 10b, and 10c, and the nature of the sleeve. The device is a wavelength division demultiplexor and here, the sleeve is a component 26 formed from metal foil which is wrapped around the assembled parts and has its edges soldered together. It has end portions 26a and 26b similar to the end portions in the first embodiment, and has a wider central section 26c formed by a more loosely wrapped part of the foil, which is preferably slightly crinkled or convoluted so as to allow for some expansion and contraction without imposing stress on the parts. The nature of the sleeves 14a and 14b, their metal coatings, and the soldered connection between the sleeve and the coatings 15 on the tubes are all the same as in the first embodiment.

Figure 3:
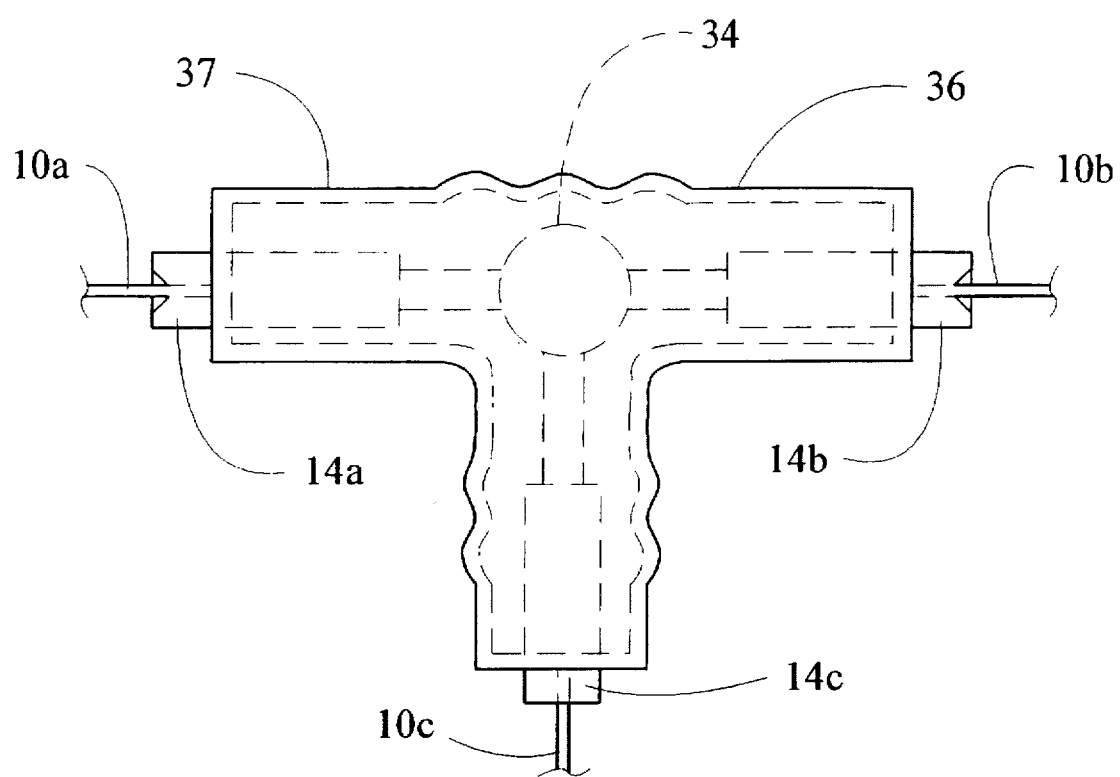
FIG. 3 shows a plan view of a third embodiment of the invention.

FIG. 3 shows a variation of the second embodiment used to provide a seal around three fibers coming together into a connector, each fiber terminating in a GRIN lens. Means are known for connecting three lenses together so that light can pass between them, using prisms, etc. and various of such known means, indicated at 34, can be used in this embodiment. Each of the fibers is provided with a fiber tube 14a, 14b, and 14c, coated with metal as previously, and the three fiber tubes are hermetically sealed by a metal foil 36 folded and formed to provide three cylindrical portions fitting around the three fiber tubes and soldered to the fiber tube coatings as in the previous embodiments. The soldered seals along the edges of the foil are indicated at 37.

Figure 4:
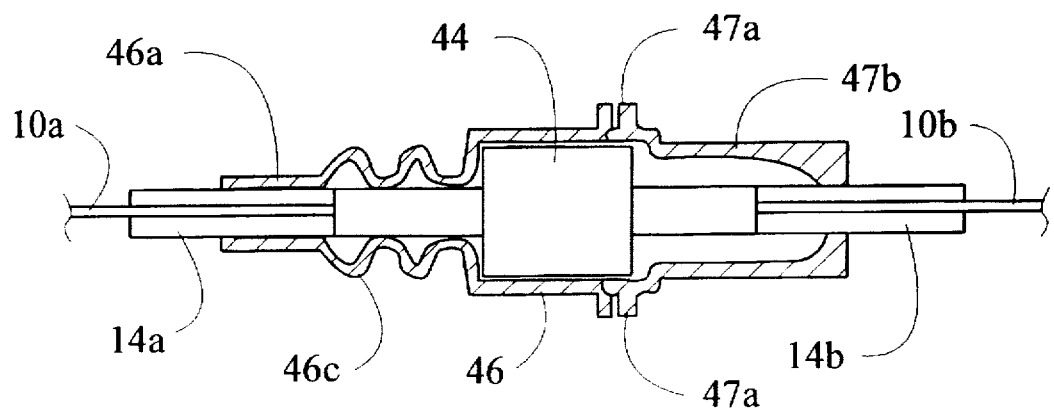
FIG. 4 shows a plan view of a fourth embodiment of the invention.

Referring now to FIG. 4, an alternative embodiment is shown wherein a two piece sleeve is used, having bellows 47a offset to one side of the device 44 contained therein. Each of the fibers is provided within a fiber tube 14a and 14b respectively coated with metal as previously, and the two fiber tubes are hermetically sealed by a metal foil 46 at edges 46a and 46b soldered to the fiber tube coatings as in the previous embodiments. This embodiment, however, differs from the previous ones in that the metal foil 46 is joined along a seam 47a by soldering the edges together along the seam 47a.

Numerous other embodiments may be envisaged, without departing from the spirit and scope of the invention.

We claim:

1. A hermetically sealed connection assembly for two or more optical fibers comprising:

two fiber ends, each terminating in an optical component such that light signals can pass from one fiber to the other;

a fiber tube mounted on each fiber, means sealing the fiber tubes to the fibers; and a thin-walled, flexible metallic sleeve connected by solder or like fusible metal to said fiber tubes and forming a hermetic seal surrounding said optical components, said metallic sleeve being adapted to accommodate expansion and contraction of the assembly.

2. A connection assembly according to claim 1, wherein the metallic sleeve is formed of foil having its edges soldered together.

3. A connection assembly according to claim 2, wherein the metallic sleeve is formed of two sleeves having edges soldered together.

4. A hermitically sealed connection assembly for two or more optical fibers as defined in claim 1, comprising, a metallic coating on each of said fiber tubes, and wherein the thin-walled, metallic sleeve is connected by solder or like fusible metal directly to said coatings on the fiber tubes.

5. A connection assembly according to claim 4, wherein the fiber tubes are formed of glass or ceramic.

6. A connection assembly according to claim 1, wherein the metallic sleeve has a portion with convolutions, pleats or crinkles to facilitate expansion and contraction of the assembly.

7. A hermetically sealed connection assembly for two or more optical fibers, comprising:

two fiber ends, each terminating in a lens, the lenses having distal end faces held together so that light can pass from one fiber to the other through the lenses;

a fiber tube mounted on each fiber adjacent the proximal ends of the lenses;

means for sealing the fiber tubes to the fibers;

a metallic coating on each of said fiber tubes; and, a thin-walled, flexible metallic sleeve connected by solder or like fusible metal directly to said coatings on the fiber tubes and forming a hermetic seal surrounding said lenses, said metallic sleeve being adapted to accommodate expansion and contraction of the assembly.

8. A connection assembly according to claim 7, wherein the metallic sleeve has a portion with convolutions, pleats or crinkles to facilitate expansion and contraction of the assembly.

* * * * *